Feb. 9, 1971  B. BACHMANN  3,561,304
AUTOMATIC WORKPIECE ENTRAINMENT DEVICE OR DRIVER
Filed May 16, 1969
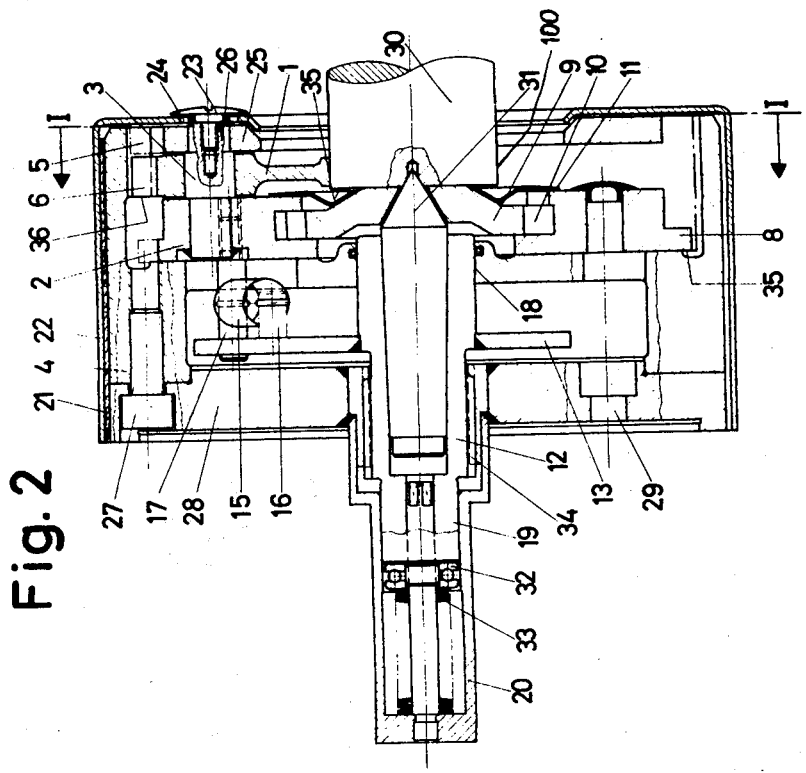
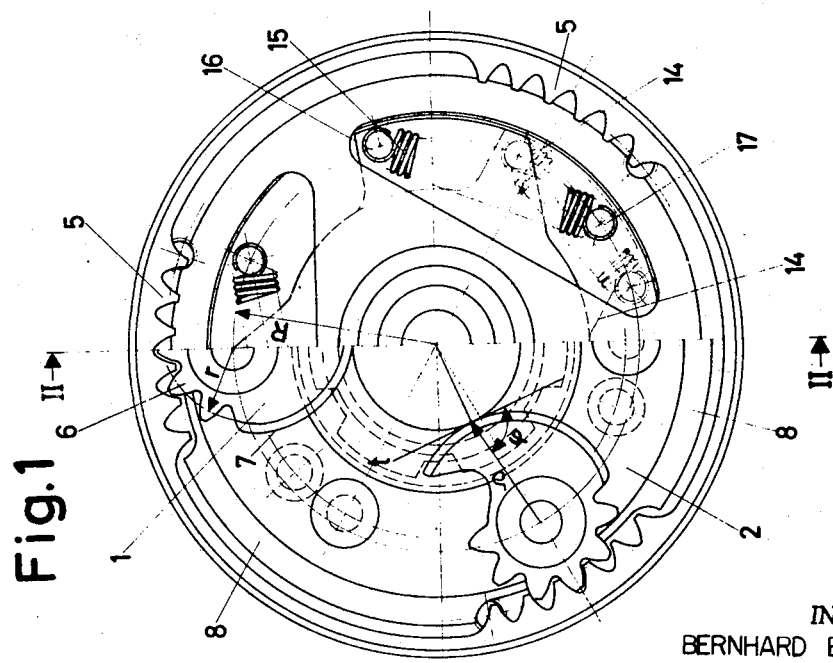
INVENTOR
BERNHARD BACHMANN
BY Jacobi, Davidson & Kleeman
ATTORNEYS United States Patent Office 3,561,304
Patented Feb. 9, 1971

3,561,304
AUTOMATIC WORKPIECE ENTRAINMENT
DEVICE OR DRIVER
Bernhard Bachmann, Schaffhausen, Switzerland, assignor to Firma Georg Fischer Aktiengesellschaft, Schaffhausen, Switzerland, a corporation of Switzerland
Filed May 16, 1969, Ser. No. 825,200
Claims priority, application Switzerland, May 21, 1968, 7,557/68
Int. Cl. B23b 33/00
U.S. Cl. 82—40                        9 Claims

ABSTRACT OF THE DISCLOSURE

There is disclosed an automatic workpiece entrainment device for attachment to machine tool spindles, especially the spindles of lathes, which comprises a freely rotatable support ring means mounted for radial and axial play with at least two clamping jaws being pivotably mounted at said support ring means. There is also provided a body member having force transmission means, said at least two clamping jaws engaging with said force transmission means so that upon relative rotation of said body member with respect to said support ring means in the machining rotational direction there occurs pivoting of said clamping jaws in the closing direction. Center means serve to center the workpiece, and center chuck means cooperate with such center means. Screw means fixedly arranged and coaxially extending with respect to the body member guide the center chuck means so that upon axial displacement thereof it simultaneously performs a rotational movement. The support ring means, upon axial displacement thereof against the side facing away from the receiving side of the entrainment device, comes into rigid or non-relative rotational engagement with the body member.

BACKGROUND OF THE INVENTION

The present invention relates to an improved automatic workpiece entrainment device or driver for mounting upon the machine tool spindles, especially the spindles of lathes, and is of the type incorporating at least two clamping jaws which are pivotably mounted at a freely rotatable support ring having radial and axial play. Furthermore, the clamping jaws operably engage with a force transmission means arranged at a body member, so that during relative rotation of the body member with respect to the support ring in the machining direction of rotation there occurs a pivoting of the clamping jaws in the closing direction, and furthermore, the inventive workpiece entrainment device is of the type equipped with center means for centering the workpiece.

Different physical constructions of entrainment devices or dogs are already known to the art. However, they all possess the drawback that only the support ring of the clamping jaws carry out a closing- or opening movement. In actual practice, however, it has been found that the entrainment device, when stationary, can be much more easily tightened or opened, respectively, by rotation of the workpiece, because then only a rolling movement occurs between the workpiece and the clamping jaws. On the other hand, during rotation of the support ring or the clamping jaws, the workpiece is rotated therewith somewhat, so that the friction between the center means and the workpiece must be overcome.

A further disadvantage of the known entrainment devices resides in the fact that during pronounced deceleration of the rotational speed of the machine spindle owing to the inertia of the workpiece and the movable components of the entrainment device, the clamping jaws raise from the workpiece and the latter is loosened. Consequently, during a reduction is the rotational speed during the cutting operation, rupture of the cutting tool can occur.

Additionally, the known entrainment devices or drivers possess the drawback that the clamping jaws do not experience any further application of force beyond the locking force at the workpiece with a corresponding reaction at the pivot pins. Therefore, there results for the jaw curve of the clamping jaws a logarithmic spiral and the angle between the radius vector and the tangent must be maintained relatively large on account of the required self-locking action. Consequently, there occurs a strong clamping or binding of the clamping jaws, so that the release of the clamping jaws during standstill is rendered more difficult.

Furthermore, the known constructions additionally have the disadvantage that for relatively small clamping diameters they possess a large external diameter, so that, for instance, only a workpiece with relatively small diameter can be clamped at a lathe due to the limited swing diameter.

SUMMARY OF THE INVENTION

Accordingly, it is a primary object of the present invention to provide an improved automatic workpiece entrainment device or driver which does not possess the aforementioned drawbacks of the prior art constructions.

Another, more specific object of the present invention relates to an improved entrainment device for attachment to machine tool spindles which is relatively simple in construction, extremely easy to use, reliably supports a workpiece or the like at a machine tool spindle, enables the rapid attachment and release of such workpiece, and has minimum servicing and maintenance requirements imposed thereupon.

Yet a further significant object of the present invention relates to an improved entrainment device for the spindles of machine tools which is relatively simple in construction, and economical to manufacture, extremely reliable in its work-holding function, and not readily subject to breakdown.

Now, in order to implement these and still further objects of the invention, which will become more readily apparent as the description proceeds, the inventive entrainment device is generally manifested by the features that the center chuck is guided by coarse threading or screw means, the latter being fixedly arranged relative to the body member and extending coaxially with respect thereto, so that the center chuck during its axial displacement simultaneously performs a rotational movement. Furthermore, according to the invention, the support ring is arranged and/or constructed in such a manner that, during an axial displacement towards the side facing away from the receiving side of the entrainment device, this support ring comes into non-relative rotational engagement with the body member.

BRIEF DESCRIPTION OF THE DRAWINGS

The invention will be better understood, and objects other than those set forth above, will become apparent, when consideration is given to the following detailed description thereof. Such description makes reference to the annexed drawing depicting a preferred embodiment of inventive workpiece entrainment device, wherein:

FIG. 1 is a sectional view of the entrainment device depicted in FIG. 2, taken substantially along the lines I—I thereof; and, FIG. 2 is a sectional view of the entrainment device depicted in FIG. 1, taken substantially along the lines II—II thereof.

DESCRIPTION OF THE PREFERRED EMBODIMENTS

Describing now the drawing, the exemplary illustrated embodiment of entrainment device, or driver of the invention, specifically capable of being attached to machine tool spindles, especially lathes, for instance, will be seen to incorporate the clamping jaws or chucks 1. These clamping jaws 1 are pivotably mounted via the pivot pins 3 to a freely rotatable support ring 2 which is designed to possess radial as well as axial play. Moreover, the clamping jaws 1 engage with a force transmitting means, here shown as toothed segments 5 arranged at a main body member 4, so that during relative rotation of the body member 4 with respect to the support ring 2 in the machining direction, there occurs a rocking or pivoting of the clamping jaws 1 in the closing direction.

Continuing, it should be further appreciated that by virtue of the toothed rim segments 5 which are relatively narrow in radial direction and the small pitch circle radius of the jaw teeth 6, it is possible to maintain the outer diameter of the entire entrainment device small. Furthermore, due to this arrangement of the toothed rim segments 5 and the clamping jaws 1, an additional tightening or clamping force is transmitted to such clamping jaws, whereby, it is possible to maintain the angle $\varphi$ between the radius vector $s$ and the tangent $t$ of the jaw curve or surface 7 smaller than was previously the case. There thus results a steeper jaw surface or curve so that for each group of clamping jaws there can be obtained a greater clamping diameter range. Due to the steeper jaw curve 7, additionally the self-locking effect of the clamping jaws 1 during standstill of the entrainment device is reduced, so that the clamping jaws can be placed with less expenditure of force into their open position.

With entrainment devices of the conventional type, without an additional tensioning or tightening force acting upon the clamping jaws 1, in order to achieve a sufficiently strong clamping throughout the entire clamping range, it is necessary that the jaw surface or curve 7 possess the form of a logarithmic spiral, that is to say, the angle $\varphi$ between the radius vector $s$ and the tangent $t$ is constant throughout the entire curve length. With a required friction angle of, for instance, $\epsilon = 10°$ then $\varphi$ equals $90° - \epsilon = 80°$. With an additional tensioning force acting upon the clamping jaws, as is the case with the illustrated inventive entrainment device, the angle $\varphi$ can be retained smaller, yet is dependent upon the radius R of the pivot pin circle, upon the pitch circle radius $r$ of the jaw pinion 6 and upon the size of the radius vector $s$ of the jaw curve or surface 7. For instance, with a pivot pin circle radius R of 72 millimeters, with a pitch circle radius $r$ of 20 millimeters and a radius vector $s$ of 26 millimeters, the angle $\varphi$ can be reduced by 4 degrees, that is to say, instead of being 80 degrees, it is now only $80° - 4° = 76°$. Consequently, the shape of the jaw curve 7 is changed in such a way that it very closely approximates an Archemedian spiral at the predetermined clamping range.

The segment-like constructed projections or shoulders 8 of the support ring 2 render possible an introduction and rotation of such support ring behind the toothed rim segments 5 of the body member 4, so that the support ring 2 is secured against dropping out by this bayonet-type locking mechanism. As a result thereof, it is not necessary to use any attachment elements as, for instance, screws or clamps and also no tools are required.

In a similar manner, the cap member 9 can be introduced into the grooves 10 of the support ring 2 by such type bayonet lock, whereby the cap member 9 is held in place by the blade spring means 11, which is secured by nonillustrated means upon the cap member 9, owing to the friction prevailing between such blade spring means 11 and the support ring 2. Furthermore, the cap member 9 prevents the entry of dirt and other contaminants as well as the chippings or shavings into the interior of the entrainment device.

So that the support ring 2 is centered when the clamping jaws 1 are opened, contact or impact surfaces 14 which extend at an inclination with respect to the radial direction are provided at the disc member 13 secured upon the center chuck 12. Tangential tension springs 15, secured at one end to the bolt means 16 connected with the disc member 13 and at the other end suspended in bolt members 17 secured to the support ring 2, serve to draw the support ring bolt members 17 always against the contact surfaces 14 and thereby center the support ring 2. When the clamping jaws 1 are located in their clamping position, upon rotation of the disc member 13 of the center chuck 12 in the closing direction, the contact surfaces 14 of the disc member 13 can raise from the bolt members 17 at the support ring 2, so that the centering action exerted upon the support ring is removed, and this support ring 2, together with the clamping jaws 1, can be freely radially adjusted, depending upon the non-circularity or "out of roundness" of the workpiece 30.

In order to be able to exactly guide the center chuck 12, it is supported at the body member 4 as far to the front as possible towards the receiving opening 100 of the entrainment device by means of the bearing arrangement 18. A second bearing, or support arrangement 19, is located in the spring sleeve 20.

In order to cover and possibly manually actuate the entrainment device, there is advantageously provided a rotatable cover means 22 which is concentrically guided by at least three guide ledges 21 at the body member 4. This cover means 22 is secured upon the pin members 3 by means of screws 23 which are introduced through bores 24 with radial play through the front wall of the cover means 22. Consequently, there is conveniently prevented a dropping out of the clamping jaws 1 and the reinforcement ring member 25. The screws 23 are thus seated rigidly via their end faces 26 upon the pivot pins 3. This manner of attachment enables an eccentric mounting of the support ring 2 with respect to the pins 3, so that the cover means 22 nonetheless still runs true. The body member 4 is threaded by means of the screws 27, or equivalent fastening devices, to the flange 28.

The entrainment device of the invention is attached by means of screws or the like, introduced through the bores 29 of the flange 28, upon the machine tool spindle or the flange thereof. The function of the entrainment device during tightening and loosening is as follows:

During clamping of the workpiece 30, it is pressed by the force of the headstock against the tapered pin or center 31. As a result, the center chuck 12 is displaced through the agency of the tapered portion of the center 31 in the direction of the pressure spring 33 supported via the ball bearing means 32. Consequently, the center chuck 12 due to its engagement with the coarse threading or screw means 24 at the flange 28 additionally has imparted to it a rotational movement. The contact surfaces 14 of the disc member 13 arranged upon the center chuck 12, which contact surfaces extend at an inclination and center the support ring 2 at the bolt members 17, tend to thus raise away from the bolt members 17. In so doing, however, the support ring 2 is rocked or pivoted by the tangential tension springs 15, until the clamping jaws 1 bear against the workpiece 30. Thereafter, the center chuck 12 is rotated further until the contact surfaces 14 raise from the bolt member 17 and centering of the support ring 2 only then occurs by the clamping jaws 1 bearing against the workpiece 30. The tangential tension springs 15 are then always biased or tensioned stronger and thus provide a good pre-tensioning or biasing of the clamping jaws 1 at the workpiece 30.

The cap member 9, during the axially directed displacement of the workpiece 30, is likewise displaced by its end face, and therefore presses the support ring 2 upon completion of the stroke with its end face or surface 35 against the body member 4, and thus blocks the support ring 2 in its tightened or tensioned position. The pin members 3, the clamping jaws 1, the reinforcement ring member 25, and the cover means 22 partake of this lengthwise displacement of the support ring 2. Consequently, there is prevented a lengthwise sliding of the clamping jaws 1 upon the workpiece 30 in the tensioned condition of the entrainment device. During rotation of the dead center 31, the workpiece 30 is rotated therewith, owing to the center friction prevailing in the tensioning rotational sense, so that a positive tensioned or tightened positions of the clamping jaws 1 is achieved.

Upon opening of the entrainment device by retracting the headstock spindle, the center chuck 12, owing to the action of the pressure spring means 33 via the ball bearing means 32, is displaced towards the front towards the introduction or receiving opening 100 of the entrainment device and simultaneously rotates in the opposite direction. Owing to the friction of the center, the workpiece 30 is rotated in the opening sense of rotation. The support ring 2 is likewise displaced forwardly by virtue of the cap member 9 engaging in its ring groove 10. The contact surfaces 14 bear against the bolt member 17 and rotate the support ring 2, so that the clamping jaws 1 open further. The clamping jaws 1 are pivoted to such an extent until the cap member 9 moving towards the front brings the support ring 2 to bear against the contact surfaces 36 of the toothed rim segments 5. Due to this construction of the inventive entrainment device, it is possible to release or to tighten the clamping jaws during their rotation. It is also equally possible to provide the entrainment device of the invention, instead of as described heretofore, with only two diametrically opposed clamping jaws.

It should be apparent from the foregoing detailed description, that the objects set forth at the outset to the specification have been successfully achieved.

Accordingly, what is claimed is:

1. An automatic workpiece entrainment device for attachment to machine tool spindles, especially the spindles of lathes, comprising a freely rotatable support ring means mounted for radial and axial play, at least two clamping jaws pivotably mounted at said support ring means, a body member, force transmission means provided at such body member, said at least two clamping jaws engaging with said force transmission means so that upon relative rotation of said body member with respect to said support ring means in the machining rotational direction there occurs pivoting of said clamping jaws in the closing direction, center means for centering the workpiece, center chuck means cooperating with said center means, screw means fixedly arranged and coaxially extending with respect to said body member for guiding said center chuck means so that upon axial displacement thereof it simultaneously performs a rotational movement, drive means connecting said support ring means and said center chuck means said support ring means being provided with means and being arranged in such a manner that upon axial displacement thereof against the side facing away from the receiving side of the entrainment device said support ring means comes into rigid rotational engagement with said body member.

2. An automatic workpiece entrainment device as defined in claim 1, wherein said support ring means includes a contact surface disposed such that during axial displacement of said support ring means towards the side facing away from the receiving side of the entrainment device said support ring means is pressed via said contact surface directly or indirectly against an associated contact surface of said body member.

3. An automatic workpiece entrainment device as defined in claim 1, further said drive means including at least two axially extending impact bolt members provided for said support ring means for centering thereof in the non-tightened condition of the entrainment device, inclined extending contact surfaces rigidly connected for rotation with said center chuck means, said inclined extending contact surfaces extending through the same angle in the same direction of rotation with respect to the radial direction, said bolt members bearing against said inclined extending contact surfaces.

4. An automatic workpiece entrainment device as defined in claim 3, wherein said contact surfaces are provided at the outer edge means of a disc member fixedly connected with said center chuck means.

5. An automatic workpiece entrainment device as defined in claim 4, further including at least one tangential tension spring means disposed between said support ring means and said disc members of said center chuck means such that said support ring means has imparted to it a moment of rotation directed in the tightening direction and said impact bolt members are pressed against said contact surfaces of said disc member.

6. An automatic workpiece entrainment device as defined in claim 1, wherein said force transmitting means provided at the body member comprises toothed segment means, said clamping jaws being provided with teeth means engaging with said toothed segment means.

7. An automatic workpiece entrainment device as defined in claim 1, further including segment-like projection means provided at the periphery of said support ring means, said body member being provided with segment-like projections, said segment-like projection means of said support ring means engaging behind said segment-like projections of said body member in the manner of a bayonet lock, so that said support ring means can only carry out in its axial direction a predetermined limited displacement, and pressure spring means for displacing said center chuck means and said support ring means in the direction of the receiving opening of the entrainment device.

8. An automatic workpiece entrainment device as defined in claim 1, further including pin means pivotably retained at one side at said support ring means, said clamping jaws being pivotally mounted upon said pin means, said pin means being operably connected at their free ends with one another via a reinforcement ring member.

9. An automatic workpiece entrainment device as defined in claim 1, further including cover means provided with at least three inwardly directed guide ledges for the concentric rotational guiding of said cover means upon said body member.

References Cited
UNITED STATES PATENTS

| | | | |
|---|---|---|---|
| 2,493,574 | 1/1950 | Durkee | 82—40 |
| 2,672,780 | 3/1954 | Schurr | 82—40 |

FOREIGN PATENTS

| | | | |
|---|---|---|---|
| 1,002,182 | 2/1957 | Germany | 82—40 |

LEONIDAS VLACHOS, Primary Examiner

U.S. Cl. X.R.

279—106